Figure 1:
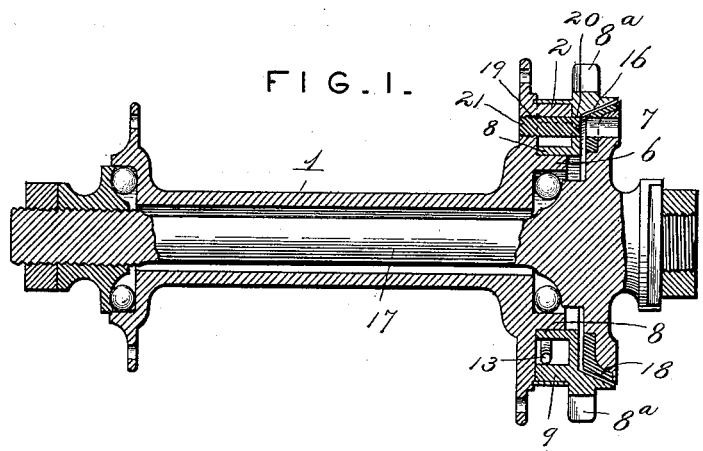

No. 627,934. Patented June 27, 1899.
C. KNAFFL.
BICYCLE BRAKE.
(Application filed Mar. 17, 1896.)
(No Model.)

Witnesses
Harry L. Amer.
Rex. Smith.

Inventor
Charles Knaffl.
By his Attorneys,
C. A. Snow & Co.

UNITED STATES PATENT OFFICE.

CHARLES KNAFFL, OF KNOXVILLE, TENNESSEE, ASSIGNOR OF ONE-THIRD TO HENRY E. MAXWELL, OF SAME PLACE.

BICYCLE-BRAKE.

SPECIFICATION forming part of Letters Patent No. 627,934, dated June 27, 1899.

Application filed March 17, 1896. Serial No. 583,558. (No model.)

*To all whom it may concern:*

Be it known that I, CHARLES KNAFFL, a citizen of the United States, residing at Knoxville, in the county of Knox and State of Tennessee, have invented a new and useful Bicycle-Brake, of which the following is a specification.

This invention relates to bicycle-brakes; and the object in view is to provide a brake which is entirely independent of the tire and arranged in proximity to the hub of the driving-wheel, whereby it is adapted to be operated and applied through the medium of the drive-chain and to exert its restraining force upon the said driving-wheel.

Other objects and advantages of the invention will appear in the course of the subjoined description.

The invention consists in an improved brake for bicycles and vehicles of a similar character embodying certain novel features and details of construction and arrangement of parts, as hereinafter fully described, illustrated in the drawings, and finally incorporated in the claims hereto appended.

Figure 2:
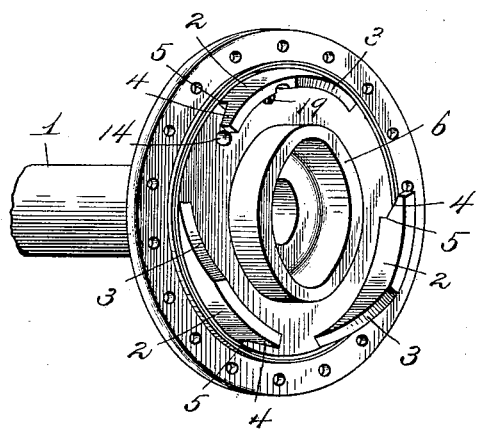
Figure 3:
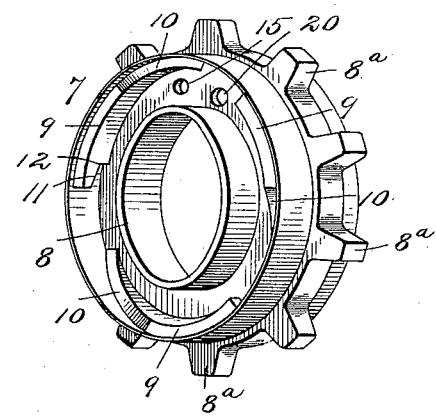
Figure 4:
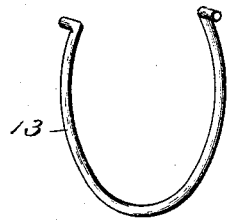

In the accompanying drawings, Figure 1 is a longitudinal section taken through the hub of the driving-wheel of the bicycle. Fig. 2 is a detail perspective view of the outer face of the hub-flange next to which the improved brake is arranged. Fig. 3 is a similar view of the inner face of the sprocket-rim. Fig. 4 is a detail view of the retracting-spring which moves the sprocket-rim inward.

Similar numerals of reference designate corresponding parts in the several figures of the drawings.

The invention herein contemplated is shown in the drawings and will be described herein as applied to the driving-wheel of an ordinary bicycle of the safety pattern; but it will be apparent that the present improvements are susceptible of other adaptations and that numerous changes in the form, proportion, and minor details of construction may be resorted to without departing from the spirit or sacrificing any of the advantages of the invention.

Owing to the liability of the ordinary forms of brakes used upon bicycles and operating against the tire to burn or abrade and otherwise injure the said tire, brakes have in a great majority of cases been dispensed with entirely, to the danger and risk, however, of the rider. The present invention aims to provide a brake which will exert its restraining force at the hub of the wheel and which may be conveniently operated or thrown into action by voluntary or involuntary back-pedaling.

Proceeding now to the details of construction, 1 designates the hub of the driving-wheel of a bicycle, one of the flanges of which upon that side of the wheel upon which the chain is used is provided upon its outer face with a series of segmental cam projections 2, having outer inclined faces or edges 3 and inner or undercut inclined faces or edges 4, extending inward from the projecting ends or extremities of the cam projections and terminating in an adrupt shoulder 5. These segmental cam projections are arranged in the arc of the same circle and as near the periphery of the hub-flange as practicable. Within the cam projections is an outwardly-projecting annular flange 6 concentric with the bore of the hub and with the arc in which the cam projections lie. This flange 6 receives the sprocket-rim 7 and serves as a bearing upon which said rim may be partially rotated, said sprocket-rim comprising an inside annular flange 8, forming its hub and surrounding and bearing upon the flange 6 of the hub of the wheel, and an outer peripheral flange projecting upon both sides of the web portion and having the sprocket-teeth $8^a$ thereon. Between the inner and outer flanges of the sprocket-rim, which are spaced apart, are arranged cams 9, which are formed similarly to the cam projections 2 of the wheel-hub, with inclined edges or faces 10, which correspond to and move against the edges or faces 3, above referred to, and with undercut inclined edges or faces 11, which register with the corresponding edges or faces 4 of the cam projections 2. The cams 9 terminate at the inner portions of their undercut edges or faces in abrupt shoulders 12, which correspond to and coöperate with the shoulders 5 of the cam projections 2 to prevent the forward rotation of the sprocket-rim without causing the latter to take up and impart a corresponding rotation to the driving-wheel. A retracting-spring 13 is arranged between the flange 7 of the sprocket-rim and the cam projections 2 and cams 9, said spring extending a greater portion of the distance around the axis of the hub and having one of its terminals deflected inward and engaged in a socket 14 in the wheel-hub and its other terminal deflected outward and engaged in a socket or perforation 15 in the web of the sprocket-rim. The office of this spring is to hold the sprocket-rim and wheel-hub in such relation that the shoulders 5 and 12 are in engagement. Upon resisting the forward rotation of the sprocket-rim the cam projections on the wheel-hub will operate against the cams of the sprocket-rim and move said rim laterally away from the hub-flange. Upon the cessation of this resistance the spring 13 will exert its force to rotate the sprocket-rim in the reverse direction, and thereupon the undercut edges or faces of the cams and cam projections will coöperate to return the sprocket-rim inward to its normal position.

The sprocket-rim is provided upon its outer face with a female cone 16, of a diameter as large as the sprocket-rim will permit. The axle (indicated at 17) has fast thereon a male cone 18, which is thus held stationary while the female cone rotates with the wheel-hub. The cone 18 being held stationary and being incapable of lateral movement, when the cone 16 is moved laterally away from the wheel-hub by means hereinabove described the inclined or oblique surfaces of the two cones will be brought into close frictional engagement and produce a binding and wedging action, which offers a considerable resistance to the rotation of the driving-wheel, thus acting as a brake. The sprocket-rim is actuated or rotated either in a forward direction, or the rotation of such rim is resisted by the ordinary driving-chain of the machine. When rotated in a forward direction, the sprocket-rim takes up and rotates the driving-wheel, but when by back pedaling the rider voluntarily or involuntarily resists the forward rotation of the sprocket-rim the driving-wheel will through its impetus operate upon the sprocket-rim and force the same laterally into binding engagement with the stationary cone.

The construction above described affords a simple, compact, and powerful brake, the presence of which on a machine is not noticeable and which will be thrown into action by even the involuntary back pressure upon the pedals on the part of the rider.

The hub-flange is provided with a threaded opening 19 and the sprocket-rim is provided in its web with an opening 20, through which a screw 21 may be passed into engagement with the threaded opening in the hub-flange for the purpose of locking the spoke-rim to the hub when it is not desired to use the brake. In order to facilitate the insertion of the screw for locking the spoke-rim, the stationary cone 18 also has an opening through which the screw 21 may be passed into and through the corresponding opening in the sprocket-rim.

The part 18 may be considered a stationary brake of circular form, and the part 16 a circular brake-shoe which is concentric with and movable toward and from the said circular brake, according to the relative rotation of the driving-wheel and driving means. The coacting cams 11 and 4 have their terminals disposed to abut and limit the relative forward turning of the driving means or sprocket-wheel 7, whereby the jamming of the clutch elements 11 and 4 is obviated, thereby providing for their quick release when turning the driving means backward, as upon back pedaling, so that the brake may be instantly set.

Having thus described the invention, what is claimed as new is—

1. In combination, a wheel-hub, a brake member rigid with the axle, a loosely-mounted positively-driven part or rim having a brake member, coöperating cams having their complementary parts attached to the wheel-hub and driven part to positively hold the said brake members separated under normal conditions, and other coöperating cams inversely disposed to the first-mentioned cams and carried by the wheel-hub and driven part to force the brake members together upon relatively reversing the direction of movement of the wheel and the said positively-driven part, substantially as set forth.

2. The combination with a wheel-hub having segmental cam projections thereon, said cam projections being formed with undercut inclined edges or faces, of a friction device fast on the stationary axle, a sprocket-rim connected loosely to the wheel-hub and provided with cams having undercut inclined edges or faces which coöperate with the corresponding edges or faces of the cam projections on the wheel-hub, a retracting-spring located between the sprocket-rim and wheel-hub and extending around or partially around the axis upon which the hub revolves and connected to the hub and rim, and provision for effecting a relative rotary movement between the rim and wheel-hub, substantially as described.

3. The combination with a wheel-hub, and a stationary axle upon which the same is mounted, of a stationary friction device fast on the axle, a sprocket-rim mounted loosely between said stationary friction device and the wheel-hub, and also provided with a friction-surface adapted to coöperate with the aforesaid stationary friction device, interlocking cams on the adjacent faces of the wheel-hub and sprocket-rim respectively, whereby the sprocket-rim will be moved laterally upon the wheel-hub upon back-pedaling, and a spring for actuating the sprocket to hold its clutch members normally in engagement with the hub, substantially as set forth.

4. The combination with the wheel-hub, and the stationary axle on which the same is mounted, of a stationary friction device fast on the axle, a sprocket-rim mounted loosely between the wheel-hub and friction device and provided with the friction-surface for engaging the latter, and means for moving the sprocket-rim laterally into engagement with the friction device, the said wheel-hub and the sprocket-rim being provided with openings which may be brought into alinement for adapting a locking screw or pin to be inserted therethrough, substantially as and for the purpose described.

5. In a brake mechanism for bicycles and like vehicles, the combination of brake members independently mounted, the one being relatively fixed, the other having connection with the driving mechanism and movable laterally toward and from the fixed brake member, coöperating cams to hold the brake mechanism out of action when the bicycle and movable brake member are driven forward, and other coöperating cams to set the brake mechanism upon back-pedaling, substantially as described.

6. In a vehicle-brake, the combination with the driving-wheel and driving means, of a circular brake mounted in a stationary manner concentric with the axis of the wheel, a brake-shoe rotatable with the driving-wheel and having lateral movement relative thereto, provisions for setting the brake upon a relative backward movement of the driving means, and cams between the wheel and brake-shoe to positively unset the brake and adapted to interlock and sustain the propelling force upon relatively rotating the driving mechanism forward, substantially as described.

7. In a vehicle-brake, the combination with the driving-wheel and driving means, of a circular brake mounted in a stationary manner concentric with the axis of the wheel, a brake-shoe rotatable with the driving-wheel and having lateral movement relative thereto, coöperating cams between the wheel and brake-shoe for setting the latter upon a relative backward movement of the driving means, and other cams between the wheel and brake-shoe to positively unset the brake and adapted to interlock and sustain the propelling force upon relatively rotating the driving means forward, substantially as specified.

8. In a vehicle-brake, the combination with a driving-wheel and driving means, of a circular brake mounted in a stationary manner concentric with the axis of the wheel, a brake-shoe adapted to operate in connection with the circular brake and supported by the driving-wheel with provisions for rotary and lateral motion relatively thereto, means interposed between the wheel and the brake-shoe for producing a relative movement to said parts parallel to the axis of the wheel under a forced rotary movement to either of said parts, a connection between the driving means and the brake-shoe whereby the latter is moved laterally away from the circular brake under the driving action of the driving means and into engagement with the said brake under the retarding action of said means, and a spring for normally holding the brake-shoe away from the circular brake and assisting the driving means in its driving operation encircling the axis of the wheel and having one end connected with its hub and the other with the brake-shoe, substantially in the manner and for the purpose specified.

In testimony that I claim the foregoing as my own I have hereto affixed my signature in the presence of two witnesses.

CHARLES KNAFFL.

Witnesses:
 E. B. PENNINGTON,
 F. H. VALENTINE.